(12) United States Patent
Ma et al.

(10) Patent No.: US 10,979,259 B1
(45) Date of Patent: Apr. 13, 2021

(54) COMMUNICATION DEVICE AND SKEW CORRECTION METHOD THEREOF

(71) Applicant: MONTAGE TECHNOLOGY CO., LTD., Shanghai (CN)

(72) Inventors: Jun Ma, Shanghai (CN); Dan Wang, Shanghai (CN); Zhongyuan Chang, Shanghai (CN); Xin Liu, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/897,292

(22) Filed: Jun. 10, 2020

(30) Foreign Application Priority Data

Dec. 2, 2019 (CN) .......................... 201911212328.9

(51) Int. Cl.
| | | |
|---|---|---|
| *H04B 3/462* | (2015.01) | |
| *H04L 27/00* | (2006.01) | |
| *H04L 5/00* | (2006.01) | |
| *H04L 25/02* | (2006.01) | |
| *H04L 7/00* | (2006.01) | |
| *H04L 7/02* | (2006.01) | |

(52) U.S. Cl.
CPC ........ *H04L 27/0014* (2013.01); *H04L 5/0053* (2013.01); *H04L 7/0016* (2013.01); *H04L 7/02* (2013.01); *H04L 25/0204* (2013.01); *H04B 3/462* (2013.01); *H04L 2027/004* (2013.01); *H04L 2027/0042* (2013.01)

(58) Field of Classification Search
CPC ..... H04L 25/14; H04L 7/0025; H04L 7/0054; H04L 7/033; H04L 7/0087; H04L 25/03878; H04L 25/49; H04L 7/0016; H04L 25/03019; H04L 25/03885; H04L 7/02; H04L 2025/03356; H04L 2025/0349; H03M 1/1215; H03M 1/0602; H03M 1/0609; H03M 5/14; H03M 7/20; H04B 3/462; H04B 3/06; H04B 1/18; H04B 15/04; H04B 1/0057; H04B 1/006; H04B 1/16; H04B 1/3827; H04B 1/40; H04B 7/0413; H04B 7/0482; H04B 7/0639
USPC ................................. 375/371, 295, 224, 354
See application file for complete search history.

(56) References Cited

U.S. PATENT DOCUMENTS

| | | | | |
|---|---|---|---|---|
| 2010/0284486 A1* | 11/2010 | Kuwata | ................... | H04L 25/14 375/295 |
| 2015/0139289 A1* | 5/2015 | Chi | ......................... | H04L 25/14 375/224 |
| 2015/0195080 A1* | 7/2015 | Liu | ....................... | H04L 7/0091 375/354 |

(Continued)

*Primary Examiner* — Eva Y Puente
(74) *Attorney, Agent, or Firm* — JCIPRNET (57) ABSTRACT

The present disclosure provides a communication device and a skew correction method thereof. The communication device includes a first signal transceiving device and a correction device. The correction device is coupled to the first signal transceiving device through multiple first channels in a correction mode, each of the first channels has multiple first sub-channels. In the correction mode, the first signal transceiving device simultaneously transmits multiple first data through all the first sub-channels of first channels, and the correction device receives the first data through all the first sub-channels to calculate first skew differences of all the first sub-channels, thus calculating first skew differences according to the first skew values.

23 Claims, 7 Drawing Sheets

(56) References Cited

U.S. PATENT DOCUMENTS

2015/0229467 A1* 8/2015 Lee .................. H04L 7/0016
375/371
2018/0343011 A1* 11/2018 Tajalli ................ H03L 7/0816

* cited by examiner

COMMUNICATION DEVICE AND SKEW CORRECTION METHOD THEREOF

CROSS-REFERENCE TO RELATED APPLICATION

This application claims the priority benefit of China application serial no. 201911212328.9, filed on Dec. 2, 2019. The entirety of the above-mentioned patent application is hereby incorporated by reference herein and made a part of this specification.

BACKGROUND

Technical Field

The present disclosure relates to the field of data transmission and communication, and more particularly to a communication device and a skew correction method thereof.

Description of Related Art

With the continuous increase of data transmission rate in communication systems, skew has become one of the key factors which determines system performance. Currently some techniques are adopted to reduce skew in data transmission.

Figure 1:
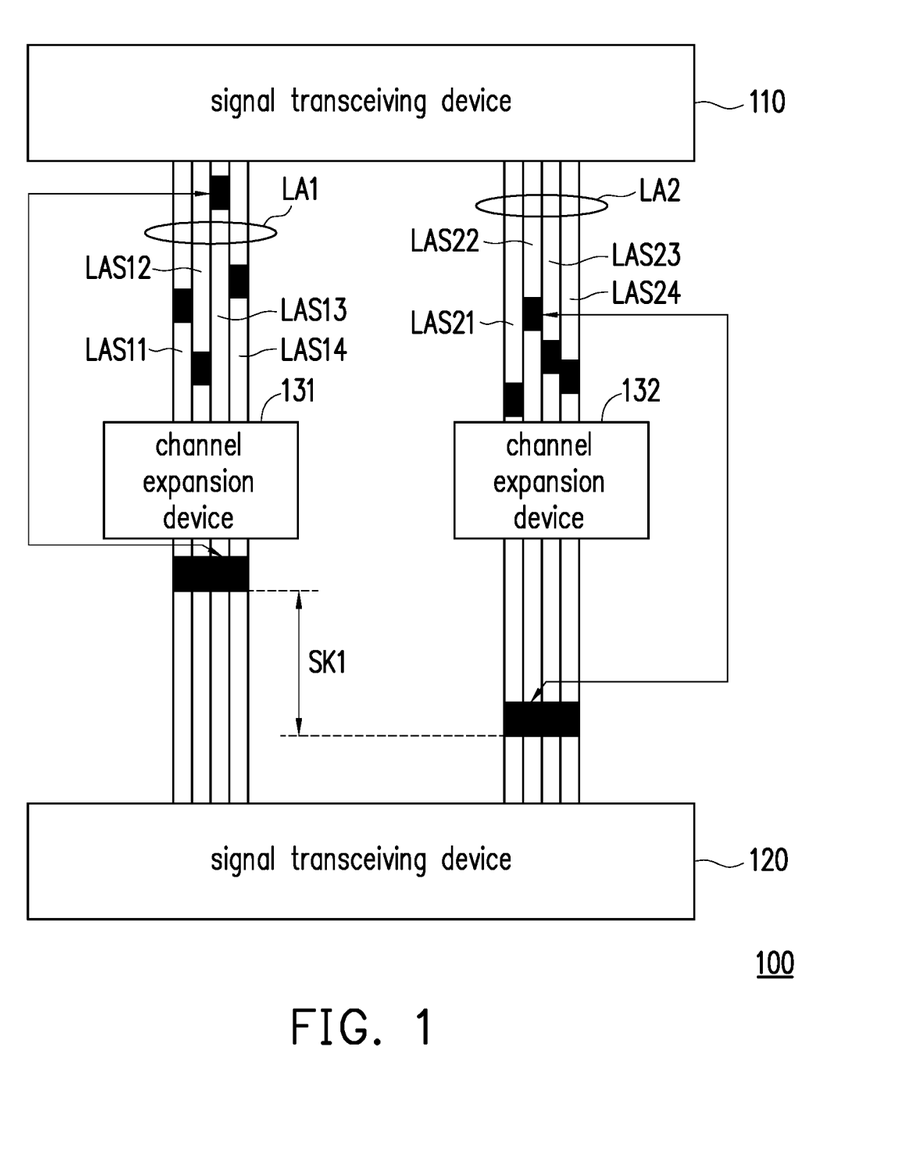
FIG. 1 is a schematic diagram showing a data transmission state of a conventional communication device.

FIG. 1 shows a data transmission state of a conventional communication device. In FIG. 1, the communication device 100 includes signal transceiving devices 110 and 120 and channel expansion devices 131 and 132. The channel expansion devices 131 and 132 are coupled between the signal transceiving device 110 and the signal transceiving device 120 through channels LA1 and LA2, respectively. The channel LA1 includes multiple sub-channels LAS11 to LAS14, and channel LA2 includes multiple sub-channels LAS21 to LAS24. Each of the channel expansion device 131 and the channel expansion device 132 can adjust only the skew of each sub-channel of corresponding channel according to the transmission delay of data received on the connected channel to synchronize the data on the sub-channels of the channel. However, since the channel expansion devices 131 cannot know the skew values on sub-channels of channel LA2, and the channel expansion devices 132 also cannot know the skew values on sub-channels of channel LA1, there is an uncontrollable skew difference SK1 between the channel LA1 and the channel LA2.

Therefore, there is a need to provide a communication device and method capable of reducing skew in data transmission.

SUMMARY

The purpose of the present disclosure is to provide a communication device and a skew correction method of a communication device, which are utilized to adjust the data transmission delay on each sub-channel of multiple channels according to the skew values of data transmitted on the channels to reduce the skew during data transmission.

According to an embodiment of the present disclosure, the communication device includes a first signal transceiving device and a correction device. The correction device is coupled to the first signal transceiving device through multiple first channels in a correction mode, and each first channel has multiple first sub-channels. Specifically, in a correction mode, the first signal transceiving device transmits the first data through each first sub-channel simultaneously, and the correction device receives the first data through each first sub-channel to calculate the first skew value for each first sub-channel, and first skew differences are calculated based on the calculated first skew values.

In an embodiment of the present disclosure, the communication device further includes multiple channel expansion devices. The channel expansion devices are coupled to the first signal transceiving device in a normal operation mode. The channel expansion devices are respectively coupled to the first signal transceiving device through the first channels. The channel expansion devices respectively adjust data transmission delay on respective first sub-channels according to the calculated first skew differences. Specifically, in a normal operation mode, the connection relationship between the correction device and the first signal transceiving device is disconnected.

In an embodiment of the present disclosure, the correction device sets the largest one of the calculated first skew values as the first reference skew, and calculates first skew differences between each first skew value and the first reference skew. The channel expansion devices respectively adjust the data transmission delay on respective first sub-channels according to the calculated first skew differences.

In an embodiment of the present disclosure, the calculated skew differences are transmitted to the channel expansion devices through an in-band mode or an out-band mode.

In an embodiment of the present disclosure, the channel expansion devices each has multiple programmable interfaces. The communication device uses the out-band mode to write the skew differences to multiple channel expansion devices respectively through multiple programmable interfaces.

In an embodiment of the present disclosure, the correction device makes the first signal transceiving device to enter the correction mode by using the in-band mode or the out-band mode, and makes the first signal transceiving device to simultaneously transmit first data through each first sub-channel of the first channels.

In an embodiment of the present disclosure, the communication device further includes a second signal transceiving device. In the correction mode, the second signal transceiving device is coupled to the correction device through second channels, each second channel includes multiple second sub-channels, and the second signal transceiving device simultaneously transmits second data through each second sub-channel of multiple second channels. The correction device receives the second data through each second sub-channel to calculate a second skew value for each second sub-channel, and calculates second skew differences for all second sub-channels according to the calculated second skew values.

In an embodiment of the present disclosure, in the normal operation mode, the channel expansion device is coupled to the second signal transceiving device through the second channel, respectively. The channel expansion devices separately adjust data transmission delay on respective second sub-channels according to the calculated second skew differences.

In an embodiment of the present disclosure, the correction device sets the largest one of the calculated second skew values as a second reference skew, and calculates second skew differences between each second skew value and the second reference skew. The channel expansion devices respectively adjust the data transmission delay on respective second sub-channels according to the calculated second skew differences.

In an embodiment of the present disclosure, the calculated second skew differences are transmitted to multiple channel expansion devices through the in-band mode or the out-band mode.

In an embodiment of the present disclosure, the correction device makes the second signal transceiving device to enter the correction mode by using the in-band mode or the out-band mode, and makes the second signal transceiving device to simultaneously transmit the second data through each second sub-channel of multiple second channels.

In an embodiment of the present disclosure, the first signal transceiving device and the second signal transceiving device include connectors for connecting the first channels and the second channels, respectively.

In an embodiment of the present disclosure, the skew correction method of a communication device includes:

coupling a correction device to a first signal transceiving device through multiple first channels in a correction mode, where each first channel having multiple first sub-channels;

in the correction mode, transmitting first data simultaneously through each first sub-channel of the multiple first channels by the first signal transceiving device, and receiving the first data through each first sub-channel to calculate a first skew value for each first sub-channel by the correction device, and calculating first skew differences for all first sub-channels according to the calculated first skew values by the correction device.

BRIEF DESCRIPTION OF THE DRAWINGS

Drawings are included to expedite further comprehension of the disclosure, and are incorporated in and constitute a part of this specification. The accompanying drawings illustrate embodiments of the present disclosure and, together with the description, serve to explain principles of the present disclosure.

DESCRIPTION OF THE EMBODIMENTS

Reference will now be made in detail to the exemplary embodiments of the present disclosure, examples of which are illustrated in the accompanying drawings. Wherever possible, the same reference numbers are used in the drawings and the description to refer to the same or similar parts.

Figure 2:
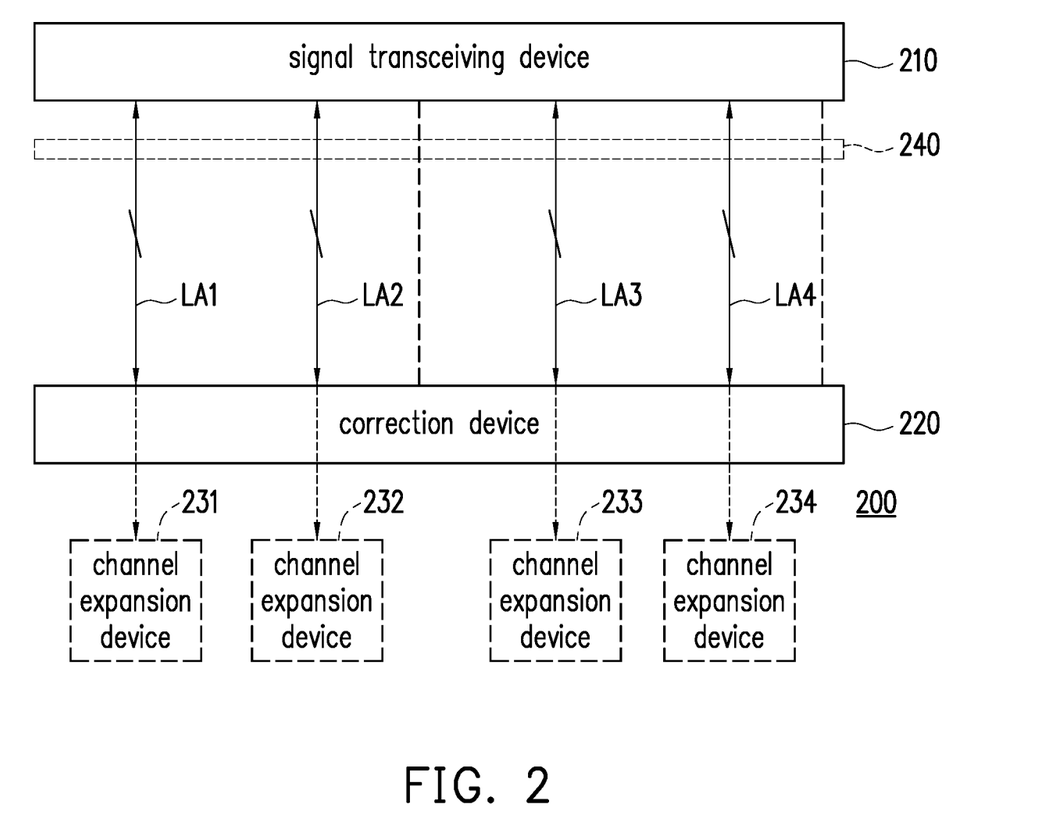
FIG. 2 is a schematic diagram of a communication device according to an embodiment of the present disclosure.

With reference to FIG. 2, FIG. 2 is a schematic view of a communication device 200 according to an embodiment of the present disclosure. The communication device 200 may include a signal transceiving device 210, a correction device 220, and/or channel expansion devices 231 to 234. In the correction mode, the signal transceiving device 210 can be coupled to the correction device 220 through channels LA1 to LA4 and disconnected from the channel expansion devices 231 to 234. In the normal operation mode, the signal transceiving device 210 is coupled to the channel expansion devices 231 to 234 through the channels LA1 to LA4 and disconnected from the correction device 220; in some examples, the correction device 220 may be removed. The channel expansion devices 231 to 234 and the correction device 220 are not simultaneously connected to the channels LA1 to LA4, or in other words, in the correction mode, the correction device 220, instead of the channel expansion devices 231 to 234, is connected to the channels LA1 to LA4. Each of the channels LA1 to LA4 has multiple sub-channels. In the embodiment of the present disclosure, the communication device 200 may further include a connector 240. The connector 240 may be disposed on the signal transceiving device 210 or disposed between the signal transceiving device 210 and the channel expansion devices 231 to 232, and serve as an interface for coupling the signal transceiving device 210 with the channel expansion devices 231 to 234. It should be noted that the connector 240 is not an essential component in this embodiment. In other embodiments of the present disclosure, the signal transceiving device 210 and the channels LA1 to LA4 can be directly connected, and there is no need to use the connector 240 as a connection interface.

Although, in FIG. 2, the correction device 220 and the channel expansion devices 231 to 234 do not overlap so as to clearly show the components, in fact, the correction device 220 and the channel expansion devices 231 to 234 are located close to each other or at the same position so that the correction device 220 and the channel expansion devices 231 to 234 can be connected to the signal transceiving device 210 through the same or approximately the same channel.

It should be noted that this disclosure only shows the use of one connector as the interface between the channel expansion devices and signal transceiving device. However, in other examples, channel expansion devices may be coupled to the signal transceiving devices through two or more discrete connectors, and the number of discrete connectors may be equal to or less than the number of channels.

Before performing normal data transmission, the data transmission delay or skews of sub-channels of all channels can be corrected (adjusted). The correction device can be used to notify the signal transceiving device to enter the correction mode. In the correction mode, the signal transceiving device 210 can transmit data simultaneously through each sub-channel of the channels LA1 to LA4. The correction device 220 can receive the data through sub-channels in the channels LA1 to LA4, and calculate the skew value of each sub-channel in the channels LA1 to LA4 according to the transmission delay of each data. The correction device 220 may further calculate skew differences of all the sub-channels according to the skew values of all the sub-channels in the channels LA1 to LA4.

In this disclosure, the data may further include signals, instructions, etc. In the transmission example in FIG. 2, data can be transmitted as a down stream or an up stream.

In the normal operation mode, the correction device 220 is disconnected, and the channel expansion devices 231 to 234 are coupled to the signal transceiving device 210 through the channels LA1 to LA4. The skew differences can be transmitted to the channel expansion devices 231 to 234, so that the channel expansion devices 231 to 234 can adjust the transmission delay of the transmitted data according to the skew differences during data transmission, and it is also possible to make the data to be substantially or nearly synchronously transmitted to reduce the skew during data transmission.

To further explain, the correction device 220 may obtain the skew values of all the sub-channels in the channels LA1 to LA4 according to the transmission delay of the data received through each of the sub-channels of the channels LA1 to LA4. The correction device 220 may set a reference skew according to all the skew values, and calculate skew differences by respectively subtracting the reference skew from all the skew values. The skew differences calculated by the correction device 220 can be transmitted to the corresponding channel expansion devices 231 to 234 through in-band mode or out-band mode. Then, data transmission delay on sub-channels of the channels LA1 to LA4 can be adjusted by the channel expansion devices 231 to 234 according to the skew differences. In this embodiment, the correction device 220 may set the largest one of all skew values as the reference skew.

It should be mentioned that in the correction mode, each data sent by the signal transceiving device 210 is provided with an identification code. The data sent at the same time may have same identification code, and the correction device 220 may perform decoding after receiving the data to obtain the identification code, and identify which of these data is sent at the same time according to the identification code, thus calculating the skew value of each sub-channel according to the transmission delay of these data. In other embodiments, the data may further have an identification code identifying which sub-channel the data comes from.

In some embodiments, the signal transceiving device 210 can continuously or periodically transmit multiple times of data to the correction device 220 in the correction mode. In this way, the correction device 220 can obtain corresponding reference skews for multiple times of data transmission. The correction device 220 may calculate an average value of the reference skews obtained for multiple times to calculate a reference skew to be set, and calculate skew differences of sub-channels of the channels LA1 to LA4 according to the set reference skew.

In addition, a buffer or a memory may be set in the correction device 220 to store the reference skew or the set reference skew and the skew differences. In other examples, a register may be provided in the correction device 220 to store the set reference skew and the skew difference.

The channel expansion devices 231 to 234 can adjust the data transmission delay on each sub-channel of the channels LA1 to LA4 according to the skew differences corresponding to each sub-channel. In this embodiment, the channel expansion devices 231 to 234 may make the sub-channels having relatively large skew differences to transmit data later than the sub-channels having relatively small skew differences. In this way, the data transmitted through each sub-channel of the channels LA1 to LA4 can be substantially or nearly synchronously transmitted to the target device.

Figure 3:
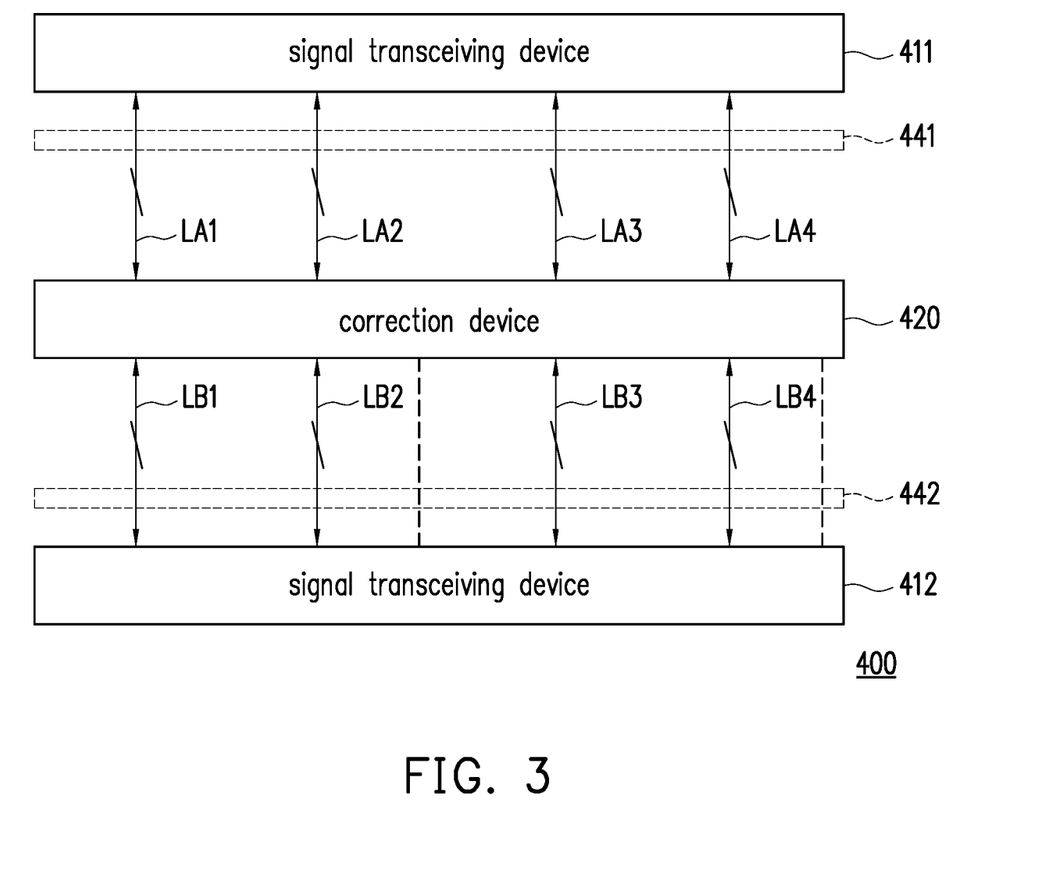
FIG. 3 is a schematic diagram of a communication device according to another embodiment of the present disclosure.

With reference to FIG. 3, FIG. 3 is a schematic view of a communication device 400 according to another embodiment of the present disclosure. The communication device 400 includes signal transceiving devices 411 and 412 and a correction device 420. In the correction mode, the signal transceiving device 411 is coupled to the correction device 420 through channels LA1 to LA4, and the signal transceiving device 412 is coupled to the correction device 420 through channels LB1 to LB4.

Optionally, in the communication device 400, the signal transceiving devices 411 and 412 may also be provided with connectors 441 and 442, respectively. The signal transceiving device 411 can be connected to the channels LA1 to LA4 through the connector 441. The signal transceiving device 412 can be connected to the channels LB1 to LB4 through the connector 442.

In the correction mode, the signal transceiving device 411 can simultaneously transmit multiple data at a first time point through multiple corresponding sub-channels included in the channels LA1 to LA4. The correction device 420 may receive the data, and calculate the skew value of each sub-channel according to the transmission delay of the data. The correction device 420 sets a reference skew according to the skew value of the sub-channel corresponding to the latest received data, and subtracts the reference skew from the skew values of all the sub-channels to generate multiple corresponding skew differences, respectively. In addition, under the same correction mode, the channel transceiving device 412 can also simultaneously transmit data at a second time point through each sub-channel included in the channels LB1 to LB4. Similarly, the correction device 420 can calculate the skew value of each sub-channel included in the channels LB1 to LB4 and then the skew difference according to the transmission delay of data. In this way, the channel expansion devices on channels LB1 to LB4 can adjust the data transmission delay.

It should be noted that the first time point and the second time point may be the same or different, and there are no certain restrictions. In addition, the first time point and the second time point can occur periodically, not necessarily a single moment.

Figure 4:
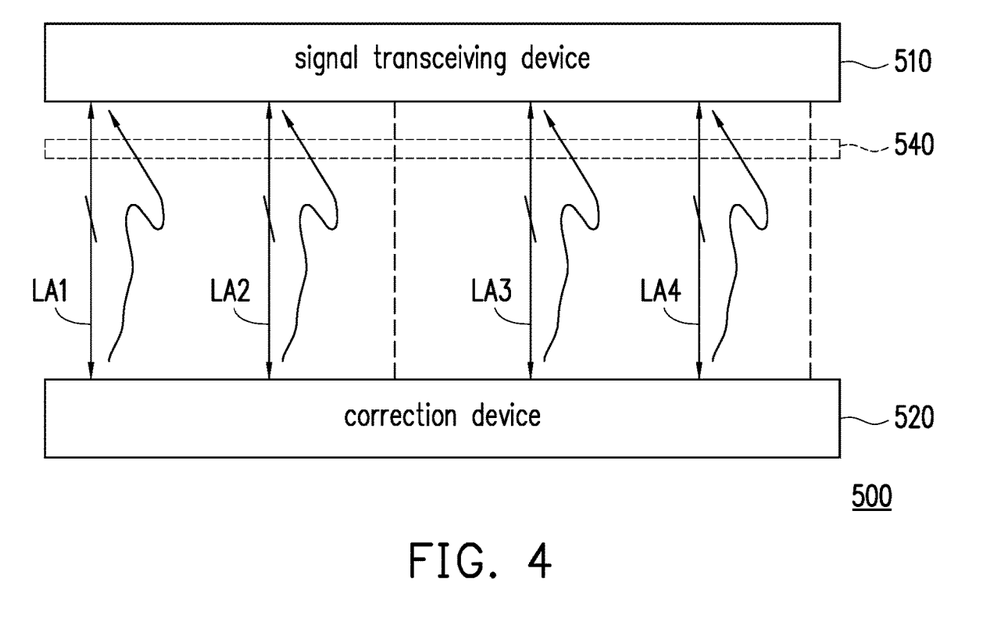
FIG. 4 and FIG. 5 are schematic diagrams of communication devices implemented through an in-band mode and an out-band mode respectively in the present disclosure.
Figure 5:
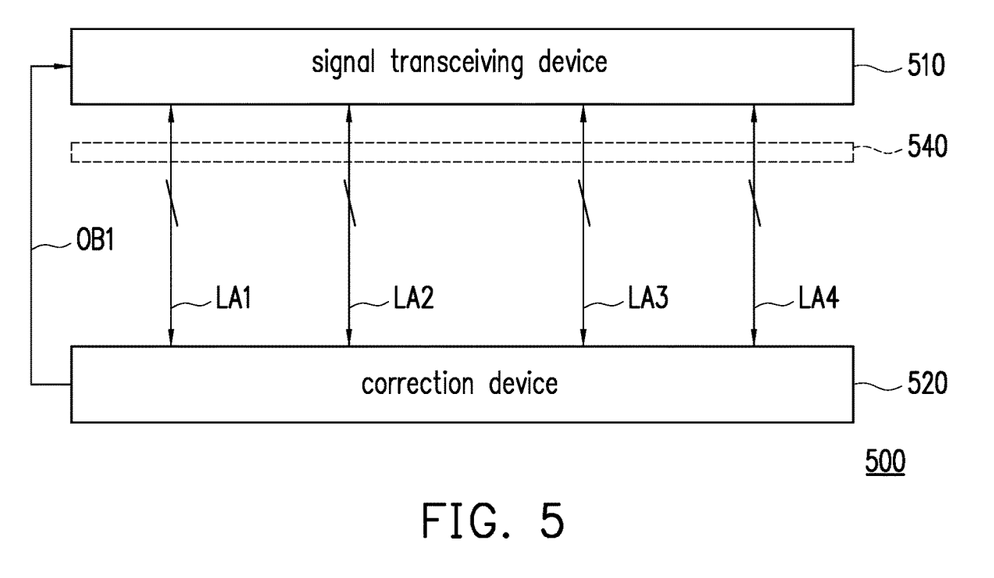

With reference to FIG. 4 and FIG. 5, FIG. 4 and FIG. 5 are schematic views of communication devices in the present disclosure implemented through an in-band mode and an out-band mode respectively. In FIG. 4, in the correction mode, the communication device 500 includes a signal transceiving device 510, a correction device 520, and a connector 540. Transmission is carried out between the signal transceiving device 510 and the correction device 520 through the channels LA1 to LA4. The connector 540 may be provided on the signal transceiving device 510 and serve as a connection interface with the channels LA1 to LA4.

In the embodiment of FIG. 4, the correction device 520 can communicate with the signal transceiving device 510 in an in-band mode. That is, the correction device 520 may notify the signal transceiving device 510 to start the correction mode by means of an in-band method (for example, turning on a resistor and not transmitting data traffic). The signal transceiving device 510 can send data to the correction device 520 simultaneously through the channels LA1 to LA4 in the correction mode.

In the embodiment of FIG. 5, the correction device 520 can communicate with the signal transceiving device 510 in an out-band mode. That is, the correction device 520 may notify the signal transceiving device 510 to start the correction mode by means of an out-band method. The signal transceiving device 510 can send data to the correction device 520 simultaneously through the channels LA1 to LA4 in the correction mode.

In some examples, the correction device 520 may perform out-of-band communication with the signal transceiving device 510 through a transmission interface (such as a system management bus (SMBus), an inter-integrated circuit bus ($I^2C$), etc.) outside the channels LA1 to LA4 or a programmable interface.

Figure 6:
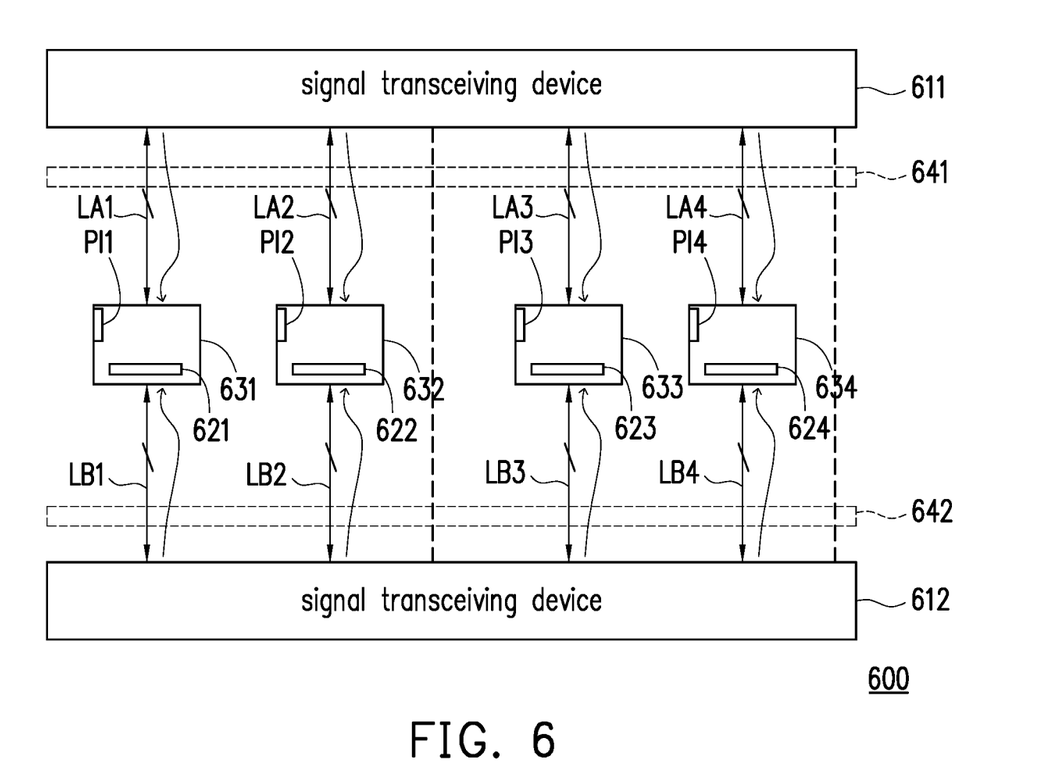
FIG. 6 is a schematic diagram of a communication device according to still another embodiment of the present disclosure.

With reference to FIG. 6, FIG. 6 is a schematic view of a communication device according to still another embodiment of the present disclosure. In the normal operation mode, the communication device 600 includes signal transceiving devices 611 and 612, and channel expansion devices 631 to 634. The signal transceiving device 611 is connected to the channel extension devices 631 to 634 through channels LA1 to LA4 respectively, and the channel expansion devices 631 to 634 are also connected to the signal transceiving device 612 through channels LB1 to LB4 respectively. The signal transceiving devices 611 and 612 may be provided with connectors 641 and 642 (optional) and connected to the channels LA1 to LA4 and channels LB1 to LB4 through the connectors 641 and 642, respectively.

In the embodiment of FIG. 6, by using in-band or out-band method, skew differences can be written into the corresponding channel expansion devices 631 to 634. In the application of out-band mode, the channel expansion devices 621 to 624 can have programmable interfaces PI1 to PI4, respectively. Through the programmable interfaces PI1 to PI4, the operation of writing or reading the skew differences into or from the channel expansion devices 621 to 624 can be performed. The channel expansion devices 631 to 634 have memories 621 to 624, respectively. The memories 621 to 624 can be used to store the skew differences, respectively.

In the application of in-band mode, in the correction mode, the correction device can store the calculated skew differences in the signal transceiving devices 611 and 612 in advance. When entering the normal operation mode, the signal transceiving devices 611 and 612 then write the skew differences to the corresponding channel expansion devices 631 to 634 through the channels LA1 to LA4 and the channels LB1 to LB4 in the in-band mode.

Figure 7:
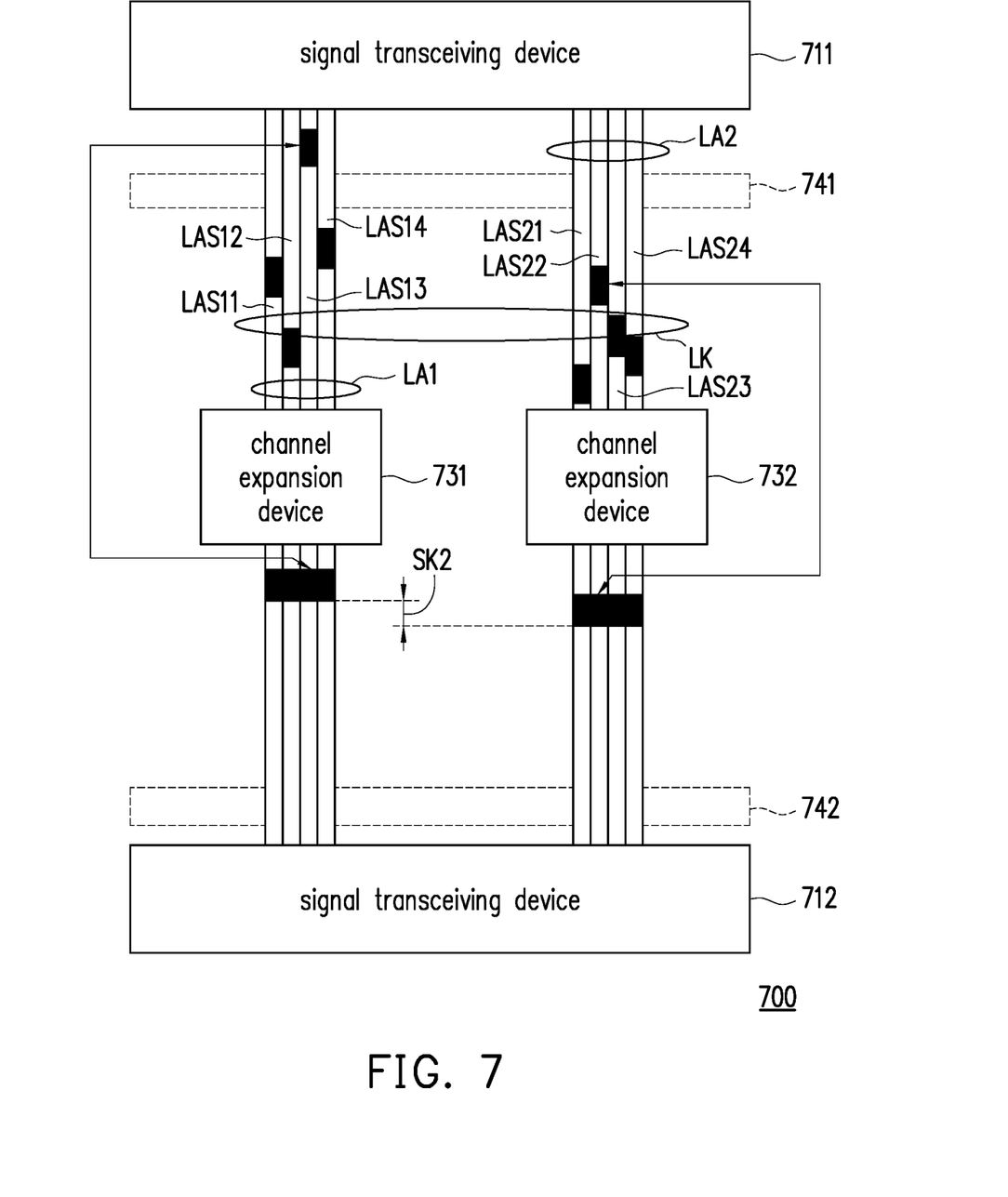
FIG. 7 is a schematic diagram of a data transmission operation of a communication device according to an embodiment of the present disclosure.

With reference to FIG. 7, FIG. 7 is a schematic view of a data transmission operation of a communication device according to an embodiment of the present disclosure. The communication device 700 includes signal transceiving devices 711 and 712, channel expansion devices 731 and 732, and optionally includes connectors 741 and 742. The communication device 700 is provided with a correction device in the correction mode. For the setting position of the correction device, please refer to the embodiment shown in FIG. 3. The signal transceiving devices 711 and 712 and the channel expansion devices 731 and 732 are connected through a link LK, and the link LK is constituted by multiple channels (for example, channels LA1 and LA2). It should be noted that, for convenience of description, only two channel expansion devices 731 and 732 and two corresponding channels LA1 and LA2 are shown in FIG. 7, but this disclosure is not limited thereto, and may include more channel expansion devices and corresponding channels. Each channel includes multiple sub-channels (for example, the channel LA1 includes multiple sub-channels LAS11 to LAS14, and the channel LA2 includes multiple sub-channels LAS21 to LAS24). In FIG. 7, by correcting the skew differences, after the channel expansion devices 731 and 732 adjust the data transmission delay, the skew difference SK2 between the data transmitted on the two channels can be reduced to zero or close to zero, or non-zero but negligible. That is, through the correction mechanism in the embodiments of the present disclosure, the communication device 700 can transmit data substantially or approximately synchronously.

Figure 8:
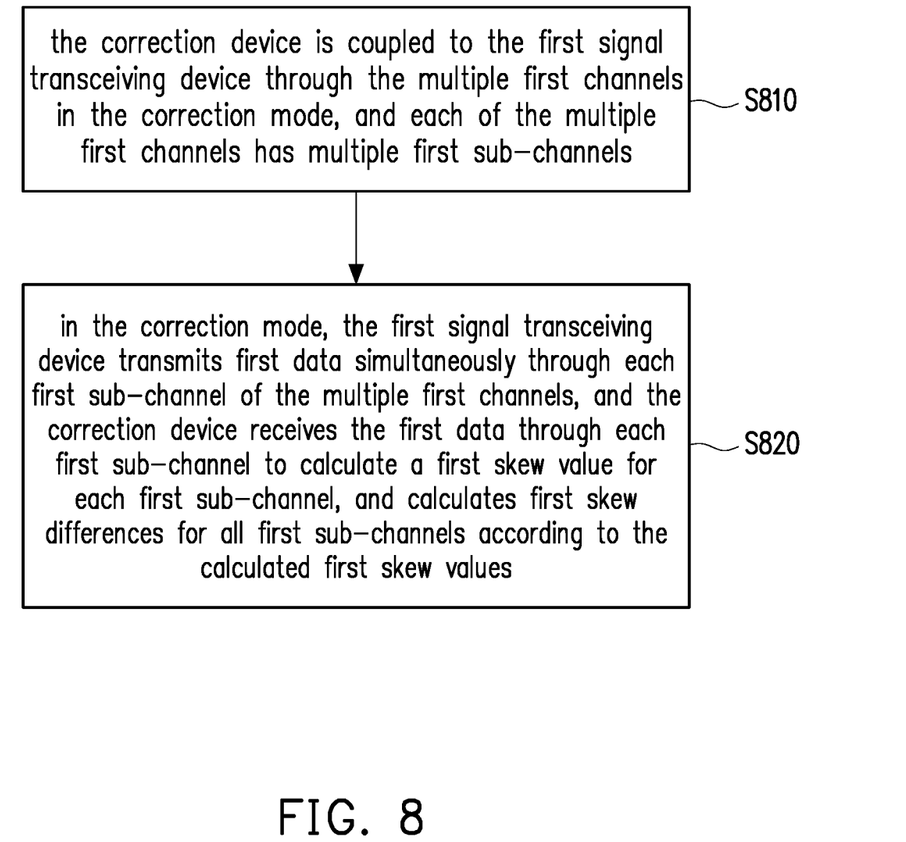
FIG. 8 is a flowchart of a skew correction method of a communication device according to an embodiment of the present disclosure.

With reference to FIG. 8, FIG. 8 is a flowchart of a skew correction method of a communication device according to an embodiment of the present disclosure. In step S810, the correction device is coupled to the first signal transceiving device through the first channels in the correction mode, and each of the first channels has multiple first sub-channels. In step S820, in the correction mode, the first signal transceiving device transmits first data simultaneously through each first sub-channel of the first channels, and the correction device receives the first data through each first sub-channel to calculate a first skew value of each first sub-channel, thus calculating a first skew difference for each first sub-channel according to the corresponding first skew value.

Regarding the implementation details of the above steps, descriptions have been thoroughly elaborated in the foregoing embodiments, and are not repeated here.

Finally, it should be noted that the above embodiments are only used to describe the technical solution of the present disclosure, rather than limiting it. Although the present disclosure has been described in detail with reference to the foregoing embodiments, those skilled in the art should understand that: the technical solutions described in the foregoing embodiments can still be modified, or some or all of the technical features can be equivalently replaced; and these modifications or replacements do not deviate the nature of the corresponding technical solutions from the scope of the technical solutions in the embodiments of this disclosure.

What is claimed is:

1. A communication device, comprising:
    a first signal transceiving device; and
    a correction device for coupling to the first signal transceiving device through multiple first channels in a correction mode, each first channel having multiple first sub-channels,
    wherein, in the correction mode, the first signal transceiving device transmits first data simultaneously through each first sub-channel of the multiple first channels, and the correction device receives the first data through each first sub-channel to calculate a first skew value for each first sub-channel, and calculates first skew differences for all first sub-channels according to the calculated first skew values.

2. The communication device according to claim 1, further comprising:
    multiple channel expansion devices, wherein in a normal operation mode, the multiple channel expansion devices are respectively coupled to the first signal transceiving device through the multiple first channels,
    the multiple channel expansion devices respectively adjust data transmission delay on respective first sub-channels according to the calculated first skew differences,
    wherein in a normal operation mode, the correction device is removed.

3. The communication device according to claim 2, wherein the correction device sets the largest one of the calculated first skew values as a first reference skew, and calculates first skew differences between each first skew value and the first reference skew, and the multiple channel expansion devices respectively adjust the data transmission delay on the respective first sub-channels according to the calculated first skew differences.

4. The communication device according to claim 2, wherein the calculated first skew differences are transmitted to the multiple channel expansion devices through an in-band mode or an out-band mode.

5. The communication device according to claim 4, wherein the multiple channel expansion devices respectively have multiple programmable interfaces, and the communication device writes the first skew differences respectively into the multiple channel expansion devices through the multiple programmable interfaces.

6. The communication device according to claim 4, wherein the correction device makes the first signal transceiving device to enter the correction mode by using the in-band mode or the out-band mode, and makes the first signal transceiving device to simultaneously transmit the first data through each first sub-channel of the first channels.

7. The communication device according to claim 2, further comprising:
a second signal transceiving device, wherein in the correction mode, the second signal transceiving device is coupled to the correction device through multiple second channels, each second channel includes multiple second sub-channels, and the second signal transceiving device simultaneously transmits second data through each second sub-channel of the multiple second channels, and the correction device receives second data through each second sub-channel to calculate a second skew value for each second sub-channel, thus calculating second skew differences for all second sub-channels according to the calculated second skew values.

8. The communication device according to claim 7, wherein, in the normal operation mode, the multiple channel expansion devices are respectively coupled to the second signal transceiving device through the multiple second channels, the multiple channel expansion devices respectively adjust data transmission delay on respective second sub-channels according to the calculated second skew differences.

9. The communication device according to claim 8, wherein the correction device sets the largest one of the calculated second skew values as a second reference skew, and calculates second skew differences between each second skew value and the second reference skew, and the multiple channel expansion devices respectively adjust the data transmission delay on respective second sub-channels according to the calculated second skew differences.

10. The communication device according to claim 8, wherein the calculated second skew differences are transmitted to the multiple channel expansion devices through an in-band mode or an out-band mode.

11. The communication device according to claim 8, wherein the correction device makes the second signal transceiving device to enter the correction mode by using an in-band mode or an out-band mode, and makes the second signal transceiving device to simultaneously transmit the second data through each second sub-channel of the multiple second channels.

12. The communication device according to claim 7, wherein the second signal transceiving device comprises:
a connector for connecting the multiple second channels.

13. The communication device according to claim 1, wherein the first signal transceiving device comprises:
a connector for connecting the multiple first channels.

14. A skew correction method of a communication device, comprising:
coupling a correction device to a first signal transceiving device through multiple first channels in a correction mode, where each first channel having multiple first sub-channels;
in the correction mode, transmitting first data simultaneously through each first sub-channel of the multiple first channels by the first signal transceiving device, and receiving the first data through each first sub-channel to calculate a first skew value for each first sub-channel by the correction device, and calculating first skew differences for all first sub-channels according to the calculated first skew values by the correction device.

15. The skew correction method according to claim 14, further comprising:
coupling multiple channel expansion devices to the first signal transceiving device through the multiple first channels respectively in a normal operation mode;
configuring the plurality of channel expansion devices to respectively adjust data transmission delay on the respective sub-channels according to the calculated first skew differences; and
making the correction device to be removed in the normal operation mode.

16. The skew correction method according to claim 15, wherein the step of calculating the first skew differences for all first sub-channels according to the calculated first skew values comprises:
setting the largest one of the calculated first skew values as a first reference skew, and calculating the first skew differences between each first skew value and the first reference skew, the multiple channel expansion devices respectively adjust the data transmission delay on the respective sub-channels according to the multiple first skew differences.

17. The skew correction method according to claim 15, further comprising:
transmitting the multiple first skew differences to the channel expansion devices in an in-band mode or an out-band mode.

18. The skew correction method according to claim 17, further comprising:
configuring the correction device to make the first signal transceiving device to enter the correction mode by using the in-band mode or the out-band mode, and making the first signal transceiving device to simultaneously transmit the first data through each first sub-channel of the multiple first channels.

19. The skew correction method according to claim 17, further comprising:
coupling a second signal transceiving device to the correction device through multiple second channels in the correction mode;
configuring the second signal transceiving device to simultaneously transmit second data through each second sub-channel of the multiple second channels, and receive the second data through each second sub-channel to calculate a second skew value for each second sub-channel, and thus calculating second skew differences for all second sub-channels according to the calculated second skew values.

20. The skew correction method according to claim 19, further comprising:
coupling respectively the multiple channel expansion devices to the second signal transceiving device through the multiple second channels in the normal operation mode, and configuring the multiple channel expansion devices to respectively adjust data transmission delay on respective second sub-channels according to the calculated second skew differences.

21. The skew correction method according to claim 20, wherein the step of calculating the second skew value for each second sub-channel, and calculating second skew differences for all second sub-channels according to the calculated second skew values comprises:
setting the largest one of the calculated second skew values as a second reference skew, and calculating the second skew differences between each second skew value and the second reference skew.

22. The skew correction method according to claim 20, further comprising:
transmitting the second skew differences to the multiple channel expansion devices in the in-band mode or the out-band mode.

23. The skew correction method according to claim 20, further comprising:
configuring the correction device to make the second signal transceiving device to enter the correction mode by using the in-band mode or the out-band mode, and making the second signal transceiving device to simultaneously transmit the second data through the each second sub-channel of multiple second channels.

* * * * *